Figure 1:
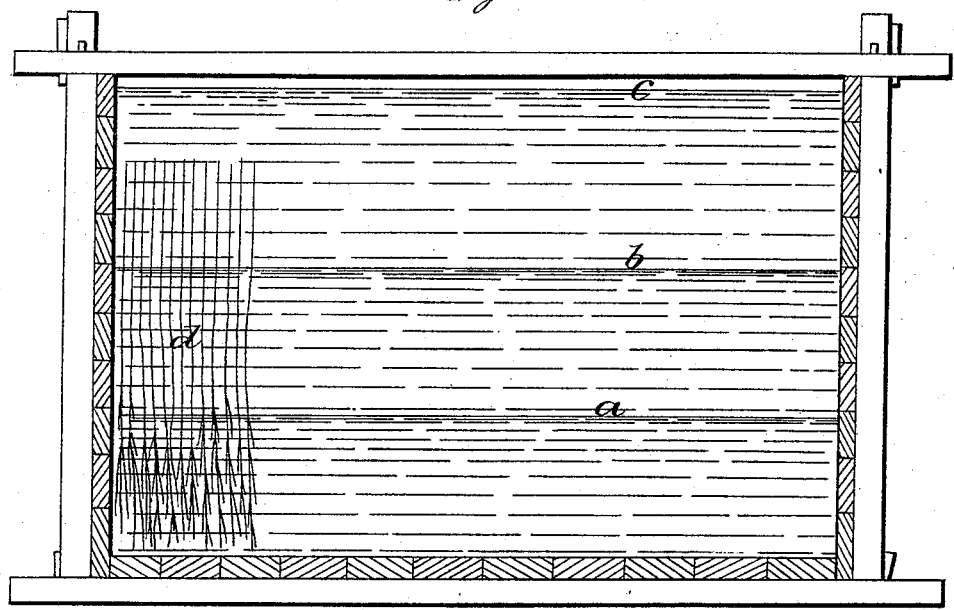

G. W. BILLINGS.
Rotting Fiber.

No. 41,825.

Patented Mar. 8, 1864.

Witnesses:
J. H. Phillips
H. S. Jones.

Inventor:
Geo. W. Billings

UNITED STATES PATENT OFFICE.

GEORGE W. BILLINGS, OF NEW YORK, N. Y.

IMPROVEMENT IN RETTING FLAX AND HEMP.

Specification forming part of Letters Patent No. 41,825, dated March 8, 1864; antedated February 21, 1864.

*To all whom it may concern:*

Be it known that I, GEORGE W. BILLINGS, of the city, county, and State of New York, have discovered and invented a new and useful Mode of Retting Flax and Hemp Straw or Stalk; and I do hereby declare that the following is a full and exact description thereof, reference being hereby had to the accompanying drawing, and to the letters of reference marked thereon, making a part of this specification.

It is well known that in the growth of flax and hemp that part of the straw or stalk nearest the earth is quite soft and porous, diminishing gradually toward the top, where it is comparatively hard and close.

It has heretofore been found impossible in retting flax and hemp straw by immersion in water or by the more common method known as "dew-retting" to obtain a uniform and equal action upon the straw or stalk, and consequent uniform condition of the fiber on separating it from the wood or inner stem of the straw or stalk. This want of uniformity and consequent loss of fiber arises from the fact that the dissolution of the particles holding the fiber to the wood or inner stem and its consequent loosening of the fiber therefrom takes place sooner at the lower end of the straw or stalk, by reason of its more porous and open nature than at the top, where it is comparatively hard and close, and, as decomposition of the fiber begins directly after the dissolution and loosening of these particles takes place, the fiber is injured and its uniformity destroyed just in proportion as the straw or stalk is acted upon by the water or dew after this dissolution and loosening takes place in the lower end, before they take place in the upper end or top.

To overcome these difficulties and consequent injury to the fiber, and in order to secure uniformity in the dissolution and loosening of these particles, I construct a vat or tank of any desirable size, but of sufficient depth to allow of the vertical immersion of the straw or stalk from six to eight inches below the surface of the water or top of the vat or tank. Through the bottom of the vat or tank, lengthwise, I lay iron pipes, through which I pass steam, for the purpose of maintaining the water in the vat or tank at a temperature of 85° to 90° Fahrenheit, which is necessary to induce and maintain rapid fermentation. I place the flax or hemp straw or stalk vertically in the vat or tank, the top end downward, until it is filled, carefully selecting the straw of stalk of nearly uniform length, and placing it close and compactly together. To keep the flax or hemp in position as placed in the vat or tank, I place over and upon it a light lattice-work, which may be made, used, and fastened down in any way or method convenience may dictate. Water as near 85° to 90° Fahrenheit as possible is then let into the vat or tank until filled sufficient to immerse or cover the flax or hemp for one-third of its length and is then suffered to remain for about twenty hours after fermentation has commenced, when more water of same temperature is let in until another one-third of the flax or hemp is immersed and covered. After remaining about twelve hours water of the same temperature is again let in until the flax or hemp is covered to the depth of at least six inches. It then remains undisturbed until the flax or hemp is thoroughly macerated, which is ordinarily accomplished in from four to six days, depending upon the condition of the straw or stalk when placed in the vat or tank. While the process of maceration is going on care must be taken to keep the water or liquid at the required temperature of 85° to 90° Fahrenheit. A thorough separation and loosening of the fiber from the wood or inner stem having been thus effected, the liquid is drawn off from the vat or tank and the flax or hemp taken out and dried, when it is ready for breaking and cleaning.

Another method adopted and used by me in filling the vat or tank with the water is, after introducing sufficient to immerse or cover the flax or hemp to about one-third of its length, in about twenty hours after fermentation has begun to fill the vat or tank to the required height by introducing the water continuously at a rate which will give the required amount in the time specified for filling sections *b* and *c* in the method first described, care being had to preserve the required temperature while it is being introduced.

The figure represents a cross-section of the retting vat or tank.

*a*, *b*, and *c* indicate the water-line at each stage of immersion, as first described.

*d* represents the flax or hemp in position.

Having thus described my invention, what I claim, and desire to secure by Letters Patent, is—

The retting of flax or hemp straw or stalk or other analogous fibers by sections at intervals, so as to produce a uniform, even, and uninjured fiber, substantially as described and set forth.

GEO. W. BILLINGS.

Witnesses:
JOHN A. HILLERY,
E. D. MOORE.